(12) United States Patent
Chandhoke et al.

(10) Patent No.: US 12,066,971 B2
(45) Date of Patent: Aug. 20, 2024

(54) DIRECT NETWORK ACCESS BY A MEMORY MAPPED PERIPHERAL DEVICE FOR SCHEDULED DATA TRANSFER ON THE NETWORK

(71) Applicant: NATIONAL INSTRUMENTS CORPORATION, Austin, TX (US)

(72) Inventors: Sundeep Chandhoke, Austin, TX (US); Glen O. Sescila, III, Pflugerville, TX (US); Rafael Castro Scorsi, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 59 days.

(21) Appl. No.: 17/669,708

(22) Filed: Feb. 11, 2022

(65) Prior Publication Data

US 2022/0164306 A1 May 26, 2022

Related U.S. Application Data

(63) Continuation of application No. 15/466,150, filed on Mar. 22, 2017, now abandoned.

(51) Int. Cl.
*G06F 13/42* (2006.01)
*G06F 9/48* (2006.01)
(Continued)

(52) U.S. Cl.
CPC ........ *G06F 13/4282* (2013.01); *G06F 9/4881* (2013.01); *G06F 9/542* (2013.01); *G06F 13/1673* (2013.01)

(58) Field of Classification Search
None
See application file for complete search history.

(56) References Cited

U.S. PATENT DOCUMENTS 5,781,774 A 7/1998 Krick
5,805,882 A 9/1998 Cooper et al.
(Continued)

OTHER PUBLICATIONS

Chandhoke et al., U.S. Appl. No. 15/417,765, entitled "Asynchronous Start for Timed Functions", filed Jan. 27, 2017, 55 pages.
(Continued)

*Primary Examiner* — Henry Tsai
*Assistant Examiner* — Christopher A Bartels
(74) *Attorney, Agent, or Firm* — Kowert, Hood, Munyon, Rankin & Goetzel, P.C.; Jeffrey C. Hood

(57) ABSTRACT

A network interface peripheral device (NIP) may include a network interface for communicating with a network, and an interconnect interface for communicating with a processor subsystem. First buffers in the NIP may hold data received from and/or distributed to peer peripherals by the NIP, and second buffers may hold payload data of scheduled data streams transmitted to and/or received from the network by the NIP. Payload data from the data in the first buffers may be stored in the second buffers and transmitted to the network according to transmit events generated based on a received schedule. Data may be received from the network according to receive events generated based on the received schedule, and distributed from the second buffers to the first buffers. A centralized system configuration entity may generate the schedule, manage configuration of the NIP, and coordinate the internal configuration of the NIP with a network configuration flow.

20 Claims, 10 Drawing Sheets

(51) Int. Cl.
*G06F 9/54* (2006.01)
*G06F 13/16* (2006.01)

(56) References Cited

U.S. PATENT DOCUMENTS

| | | | |
|---|---|---|---|
| 6,983,393 B2 | 1/2006 | Truchard et al. | |
| 7,453,906 B2 | 11/2008 | Simonnet et al. | |
| 7,529,887 B1 | 5/2009 | Haase et al. | |
| 8,127,059 B1 | 2/2012 | Carr et al. | |
| 8,295,287 B2 | 10/2012 | Chandhoke | |
| 8,307,136 B2 | 11/2012 | Feiereisel | |
| 8,458,371 B2 | 6/2013 | Scorsi et al. | |
| 9,246,852 B2 | 1/2016 | Chandhoke | |
| 9,286,261 B1 * | 3/2016 | Tzelnic | G06F 15/167 |
| 9,495,303 B2 | 11/2016 | Harriman | |
| 9,916,257 B2 | 3/2018 | Sankaran et al. | |
| 10,110,679 B2 | 10/2018 | Chandhoke | |
| 10,860,511 B1 * | 12/2020 | Thompson | G06F 13/28 |
| 11,409,685 B1 * | 8/2022 | Kaplan | H04L 67/1095 |
| 2002/0133646 A1 | 9/2002 | Cheung et al. | |
| 2003/0172221 A1 | 9/2003 | McNeil | |
| 2004/0148460 A1 | 7/2004 | Steinmetz et al. | |
| 2008/0133779 A1 | 6/2008 | Ho et al. | |
| 2008/0235415 A1 | 9/2008 | Clark et al. | |
| 2009/0103362 A1 | 4/2009 | Pekny et al. | |
| 2009/0137318 A1 | 5/2009 | Russo et al. | |
| 2011/0153910 A1 | 6/2011 | MacKenna et al. | |
| 2012/0137075 A1 | 5/2012 | Vorbach | |
| 2012/0297043 A1 | 11/2012 | Davis et al. | |
| 2012/0324147 A1 | 12/2012 | Lai | |
| 2013/0060993 A1 | 3/2013 | Park et al. | |
| 2013/0198312 A1 * | 8/2013 | Tamir | H04L 67/1097 709/212 |
| 2013/0325998 A1 * | 12/2013 | Hormuth | H04L 41/06 709/212 |
| 2013/0346756 A1 | 12/2013 | Cook et al. | |
| 2013/0346814 A1 * | 12/2013 | Zadigian | G01R 31/318536 714/724 |
| 2014/0071982 A1 | 3/2014 | Chandhoke et al. | |
| 2014/0281057 A1 * | 9/2014 | Cohen | G06F 3/0656 710/52 |
| 2016/0173416 A1 | 6/2016 | Edmiston et al. | |
| 2017/0039162 A1 | 2/2017 | Mishra et al. | |
| 2018/0062919 A1 | 3/2018 | Justin et al. | |
| 2018/0217954 A1 | 8/2018 | Chandhoke et al. | |
| 2020/0210205 A1 | 7/2020 | Govindarajan et al. | |
| 2022/0222190 A1 * | 7/2022 | Kee | G06F 12/0866 |

OTHER PUBLICATIONS

Non-Final Office Action in U.S. Appl. No. 15/417,765, mailed Aug. 7, 2018, 19 pages.
Non-Final Office Action in U.S. Appl. No. 15/417,765, mailed Apr. 2, 2019, 10 pages.
Final Office Action in U.S. Appl. No. 15/417,765, mailed Oct. 21, 2019, 10 pages.
Intel; "Intel Ethernet Controller i210 Datasheet"; Order No. 333016-007; Revision No. 3.3; Jun. 2018; 872 pgs.

* cited by examiner

DIRECT NETWORK ACCESS BY A MEMORY MAPPED PERIPHERAL DEVICE FOR SCHEDULED DATA TRANSFER ON THE NETWORK

PRIORITY CLAIM

This application is a continuation of U.S. application Ser. No. 15/466,150, titled "Direct Network Access by a Memory Mapped Peripheral Device for Scheduled Data Transfer on the Network", filed on Mar. 22, 2017, which is hereby incorporated by reference as though fully and completely set forth herein.

FIELD OF THE INVENTION

The present invention relates to the field of distributed systems, and more particularly to direct network access by peripheral devices for scheduled data transfers on the network.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation. The instrumentation hardware may be configured and controlled by software executing on a host computer system coupled to the system, or by a controller card installed in the chassis. The software for configuring and controlling the instrumentation system typically includes driver software and the instrumentation application software, or the application.

A host computer system is typically a processor-based device which fundamentally consists of a Central Processing Unit (CPU), memory and peripherals. A processor architecture or processor subsystem may typically use a memory-mapped interconnect to connect peripherals to the memory. A memory bus generally acts as an interface to the CPU, the memory, and the memory interconnect. To enable data exchange between the peripherals and the CPU, a memory-mapped interconnect, like PCI-Express for example, is used to connect the peripherals to the memory bus. To exchange data between the CPU and the peripherals, data is written to and read from the shared memory. Memory mapped interconnects also allow peer-to-peer data exchange between the peripherals, bypassing the memory bus and the memory.

To connect such a processor-based system to a network (e.g. Ethernet), one of the peripherals implements the network interface. Data from the memory or any of the peer-peripherals can be transmitted to and received from the network via the network interface inside the network interface peripheral. Data from the network interface peripheral can be written to the memory or read from the memory via a first data path, for the CPU to exchange data with other devices on the network. Additionally peer peripherals other than the network interface peripheral can also exchange data with the network via a second data path, bypassing the memory bus and the CPU. Converged networking technologies (e.g. IEEE 802.1Q with time-sensitive networking features) enable best-effort and scheduled traffic (latency critical) to coexist on the same network. While such a system provides a solid and effective interconnect between the various distributed elements, including various devices/elements that are also part of or connected to the network, there is room for improvement in the design of the peripherals to allow direct network access for scheduled data transfers on the network.

Other corresponding issues related to the prior art will become apparent to one skilled in the art after comparing such prior art with the present invention as described herein.

SUMMARY

Various embodiments of a system and method for direct network access by a memory mapped peripheral device for scheduled data transfer on the network are presented below.

A broad range of applications are currently driving the need for distributed data acquisition and control. Examples of such applications include infotainment, industrial control, power transmission and/or generation, transportation control, automotive control, avionics, home networks, media converters, machine/structural health monitoring, and real-time testing, just to name a few. Such applications require the same level of synchronization over a network as achieved inside a chassis. Timely transfer of data from sensors to processing units is becoming increasingly important for "closing the loop" over the network, efficient bandwidth utilization of the network, and reducing cycle time (increasing productivity).

Converged networking technologies (e.g. IEEE 802.1Q with time-sensitive networking features) enable best-effort and scheduled traffic (latency critical) to coexist on the same network. Various mechanisms in existence today enable implementation of network functions on peripherals to transmit and receive packets of data on the network from memory (CPU access) using a schedule and with minimal jitter. However, there are presently no mechanisms defined for peer peripherals to transmit and receive data on a network via a peripheral implementing the network interface and using a schedule. Various embodiments are presented herein of a system and method for implementing direct network access by a memory mapped peripheral device for scheduled data transfers on the network.

Accordingly, a network interface peripheral device may include a network interface for communicating with a network, and may also include an interconnect interface for communicating with a processor subsystem. The network interface peripheral device may further include a first set of buffers to hold peripherals data associated with peer peripheral devices coupled to the processor subsystem, and a second set of buffers to hold payload data of scheduled data streams transmitted over the network. The network interface peripheral device may use a data handler to generate the payload data from the peripherals data and store the payload data in the second set of buffers for transmission over the network, according to one or more timed events, and/or may further use the data handler to generate the peripherals data from the payload data and store the peripherals data in the second set of buffers for transmission to the peer peripheral devices, according to the one or more timed events. A scheduler in the network interface peripheral device, may create the one or more timed events, which may include one or more transmit events, with each respective transmit event instructing the data handler to fetch corresponding transmit data included in the peripherals data, generate at least a portion of the payload data from the corresponding transmit data, and store the portion of the payload data in the second set of buffers for transmission over the network. The one or more timed events may also include one or more receive events, with each respective receive event instructing the data handler to fetch corresponding receive data included in the payload data, generate at least a portion of the peripherals data from the corresponding receive data, and store the portion of the peripherals data in the first set of buffers for transmission to the peer peripheral devices.

In some embodiments, the peripherals data may include one or more data sets, with the first set of buffers including one respective buffer per peer peripheral device per data set. The peripherals data may include multiple data sets corresponding to a single peer peripheral device. The second set of buffers may include one respective buffer per scheduled data stream, and each scheduled data stream may include transmit data streams transmitted by the network interface peripheral device and/or receive data streams received by the network interface peripheral device. In some embodiments, the data handler may multiplex peripherals data from multiple buffers of the first set of buffers into a single buffer of the second set of buffers. The data handler may distribute payload data from a single buffer of the second set of buffers into multiple buffers of the first set of buffers. In addition, the data handler may transmit data over the interconnect interface to the peer peripheral devices from the first set of buffers, and/or may receive data over the interconnect interface from the peer peripheral devices into the first set of buffers.

In some embodiments, the network interface peripheral device may further include a state machine to coordinate internal initialization and set up of the peripheral device with a centralized system configuration flow, and the state machine may be controlled by a centralized system configuration entity disposed outside of the peripheral device. Furthermore, the network interface peripheral device may be part of a main host device that also includes the processor subsystem and the peer peripheral devices, and the main host device may be included in a networked system that also includes the centralized system configuration entity along with a network schedule generator and an application schedule generator.

In some embodiments, the network interface peripheral device may be set up for operation as follows. When the network interface peripheral device is powered on, it may boot up into an Initialization state, and an application executing on the main host device (e.g. in the processor subsystem) may receive a request from the centralized system configuration entity to transition the network interface peripheral device to a Configuration state. Upon receiving that request, the application may perform internal application initialization which may include configuring the data sources and data sinks between the processor subsystem and the peripheral devices, and between the various peripheral devices themselves. The internal application initialization may also include configuring the network interface peripheral device with the first set of buffers to store the data sets from the peer peripheral devices. The application may then configure the data handler with the source and sink information of the first set of buffers, e.g. with link information between the first set of buffers and data sets on the peer peripheral devices. The network interface peripheral device may then create the mapping between the first set of buffers and the second set of buffers, e.g. based on the number of network streams and payload size.

The application may then publish the requirements for system configuration, e.g. the number of network streams it intends to transmit/receive, and may also publish the application timing constraints (e.g. fastest period it can run the application, minimum preparation time before performing any function, etc.) for the system configuration to read. At this point, the application may be ready to receive configuration information from the centralized system configuration entity. After this internal initialization, the application may transition the main host device into a Configuration state.

The network schedule generator schedule the network streams between the devices connected to each other over the network (including the main host device and any additional devices). The application schedule generator may compute the schedule of timed functions on the master device. The centralized system configuration entity may read the published stream and application timing information, and may obtain the user requirements—e.g. period of streams, stream link information, latency requirements etc.—and provide these user requirements along with the stream and application timing constraints to the application schedule generator. The application schedule generator may compute the stream relationships (e.g. does one stream need to finish before the second one starts, etc.) and possible start times for the streams and the maximum latency acceptable to meet the application timing constrains. This information may then be relayed to the network schedule generator which may compute the schedule for the streams within the network. It may return the start time of streams for transmission and the expected arrival time of the streams for reception to the system configuration entity. The system configuration may distribute this information along with application timing information to all the devices it is configuring, and request all the devices to transition to a Ready state.

Receipt of a state transition request by the main host device to transition to the Ready state is indicative of the application having received the stream schedule and application timing information. Accordingly, the main host device may provide the stream schedule to the network interface peripheral device, which may then configure the network transmission and reception layer with this schedule, and link it to the second set of buffers. The network interface peripheral device may also configures the scheduler with timing information indicative of (or indicating) when to create the timed events (e.g. data handler transmit events and data handler receive events. These events instruct the data handler to move the data between the first set of buffers and the peer peripheral devices, and between the first set of buffers and the second set of buffers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiment is considered in conjunction with the following drawings, in which.

Figure 1:
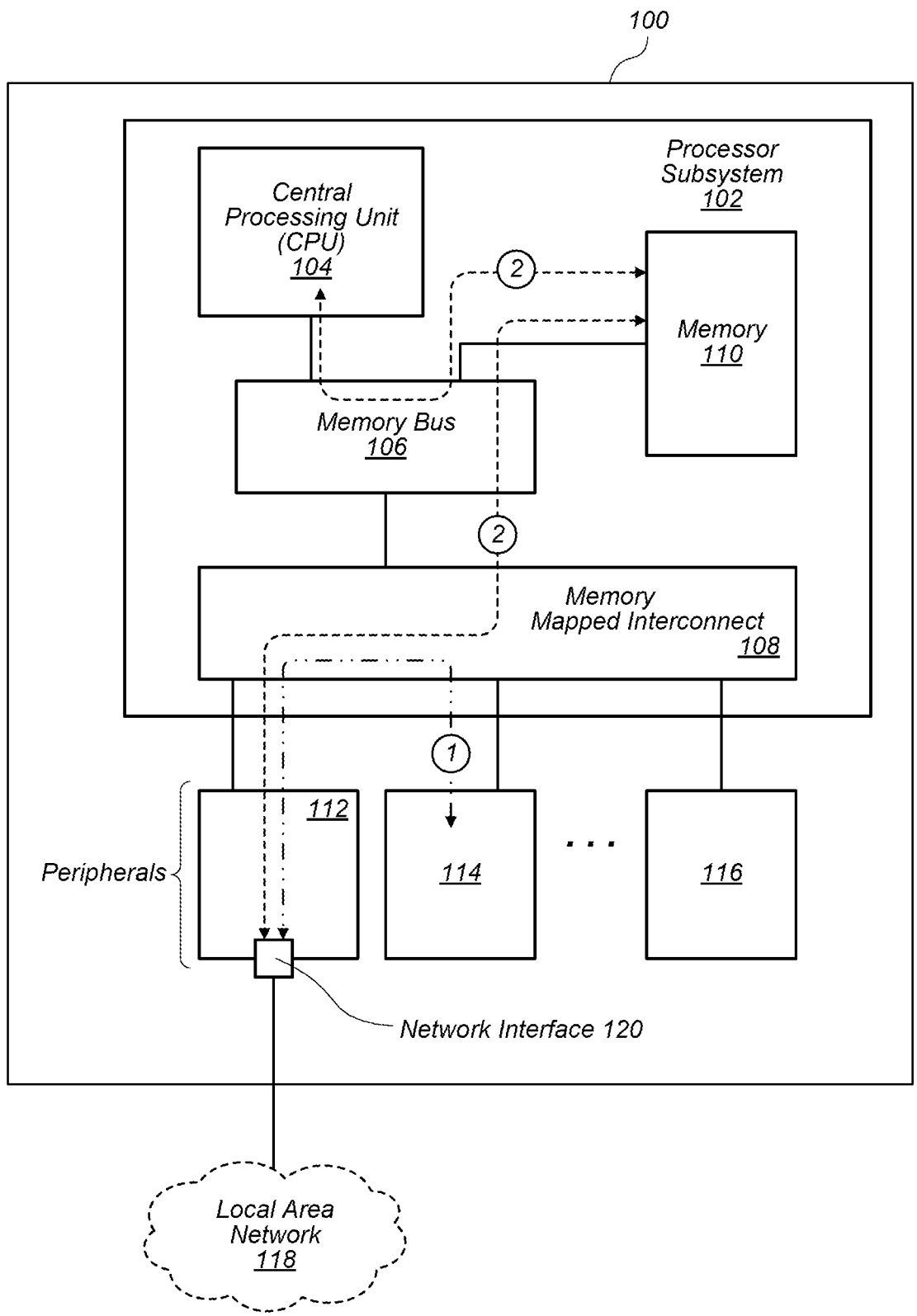
FIG. 1 shows an exemplary circuit-block diagram of a processor-based device that includes multiple peripheral devices, one of which is an improved network interface peripheral device capable of facilitating scheduled data transfer over the network, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF VARIOUS EMBODIMENTS

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/System-Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, Snap-Master™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized", "globally optimum", and "globally optimal" mean "globally improved with respect to specified criteria". One example of a global optimization method is differential evolution, which optimizes a problem (system or process) via iterative improvement of candidate solutions with respect to some specified measure of quality.

Latency Requirements—refers to the latency (time/duration) desired by a system application for a stream regarding the time from transmission from the master device producing the stream to the time when it is received by a master device consuming the stream.

Period—refers to the cyclic rate at which the stream is transmitted, i.e., the duration of one cycle.

Timed Function Characterization—refers to the determination of the worst case execution time (WCET), and the minimum and maximum period for execution of the timed function.

Time Sensitive Stream Bandwidth—refers to the data transmitted every cycle in a stream.

Time Sensitive Stream Characterization—refers to the (transmission) tx copy time and (reception) rx copy time by a stream on a master device.

Path Computation—refers to an algorithm to compute optimal routing of a stream from a master device producing the stream to a master device consuming the stream.

Performance Metrics of the Network—refers to delays (i.e., latencies) encountered by a stream as it passes through a bridge/switch and propagation (e.g., cable) delay.

Link Speed—refers to network bandwidth available for transmission of a stream (e.g., 1 Gigabit/sec, 10 Gigabit/sec, and so forth).

Network Topology—refers to or specifies the connectivity of components of a network, e.g., the bridges/switches connecting one master device to another.

Physical I/O—refers to input and output signals for monitoring/controlling a physical system, process, or environment. For example, one exemplary physical input is a physical signal derived from a sensor or a motor drive indicating the present condition of the environment or system connected to the sensor or motor drive. Similarly, one exemplary physical output is a physical signal used to change the state of an actuator or a motor drive with the intention of causing a change to the environment or system connected to the actuator or motor drive.

Centralized Configuration Device—refers to a configuration device in a distributed system, i.e., in a networked system, that operates to configure other devices in the system, where the configuration device's functionality is not distributed, but rather is comprised within a single device or entity. In other words, the configuration device provides for centralized configuration functionality in an otherwise distributed system.

Processor-Based Device (or System) with Peripherals

FIG. 1 shows an exemplary circuit-block diagram of a processor-based device (or system) 100 that includes multiple peripheral devices, one of which is an improved network interface peripheral device capable of facilitating scheduled data transfer over the network. As shown in FIG. 1, the processor architecture or processor subsystem 102 uses a memory-mapped interconnect 108 to connect peripherals 112, 114 ... 116 to the memory 110. A memory bus 106 acts as an interface to the CPU 104, the memory 110 and the memory interconnect 108. To enable data exchange between the peripherals 112, 114 ... 116 and CPU 104, a memory-mapped interconnect 108 (e.g. PCI-Express) is used connect the peripherals 112, 114 ... 116 to memory bus 106. To exchange data between CPU 104 and peripherals 112, 114 ... 116, data is written to and read from the shared memory 110. Memory mapped interconnects also allow peer-to-peer data exchange between peripherals 112, 114 ... 116, bypassing the memory bus 106 and memory 110.

One of the peripherals, in this case peripheral device 112, may implement a network interface (or network interface function) to connect processor-based system 102 to a network (e.g. to the Ethernet, exemplified as Local Area Network, or LAN 118 in FIG. 1). Data from memory 110 or peer-peripherals 112, 114 ... 116 may be transmitted to and received from network 118 via network interface 120 through network interface peripheral device 112. Data from peripheral device 112 may be written to memory 110 or read from memory 110 via data path 2, facilitating data exchange between CPU 104 and other devices on network 118. Additionally, peer-peripheral devices, such as peripheral 114 ("peer-peripherals" and "peer-peripheral devices" referring to peripherals other than the peripheral device—e.g. 112—implementing the network function) may also exchange data with network 118 via data path 1, bypassing memory bus 106 and CPU 104. Converged networking technologies (e.g. IEEE 802.1Q with time-sensitive networking features) enable best-effort and scheduled traffic (latency critical) to coexist on the same network. Accordingly, peripheral device 112 also facilitates direct network access by device/system 100 for scheduled data transfers on LAN 118.

Improved Peripheral Device

Figure 2:
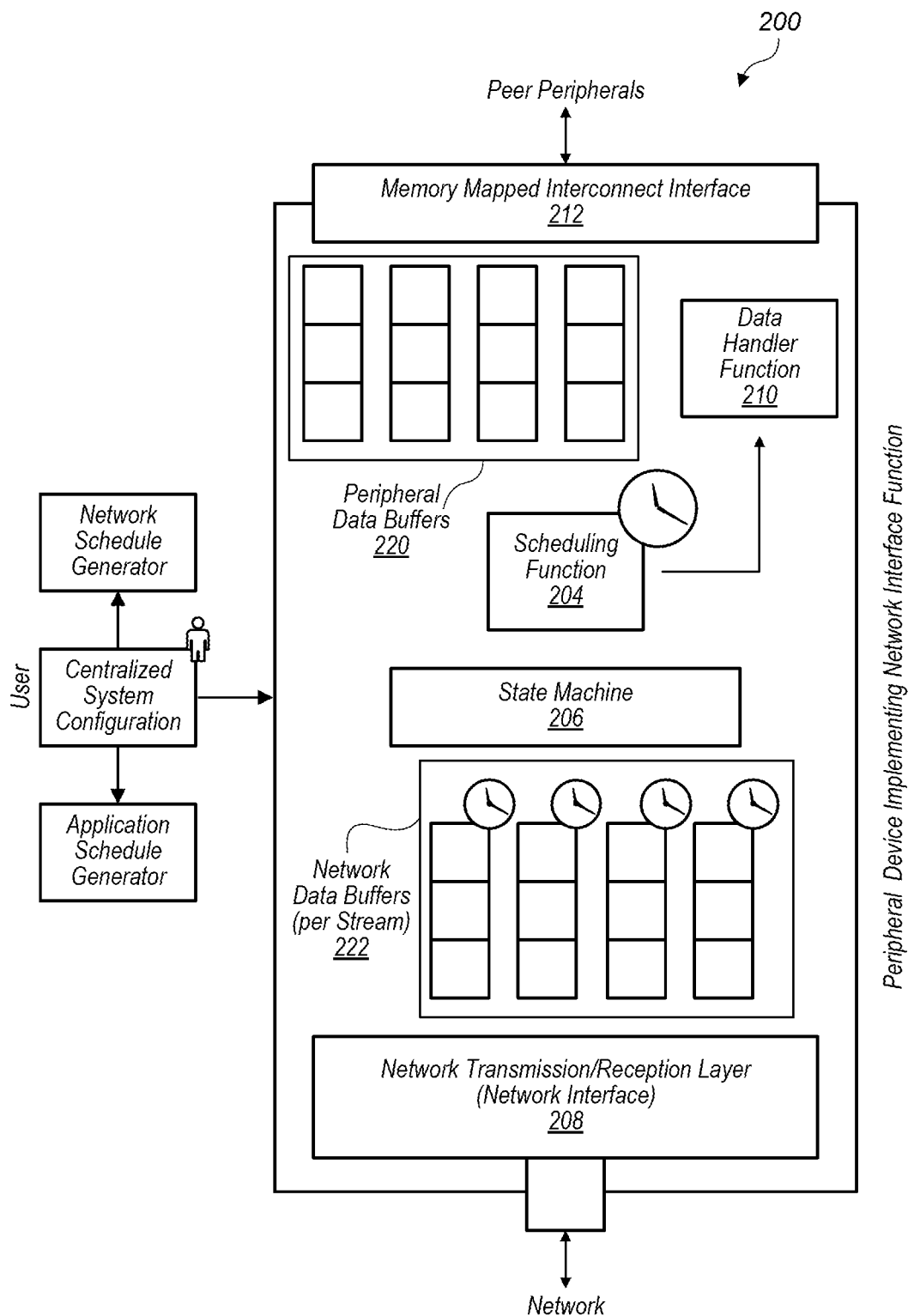
FIG. 2 shows an exemplary circuit-block diagram of an improved network interface peripheral device with network function capable of managing scheduled data transfer over the network, according to some embodiments.

To enable or facilitate scheduled data transfers on the network directly from peripherals, such as the peripheral devices shown in FIG. 1, for example, certain enhancements may be implemented in the design of peripherals/peripheral devices. The enhancements may be additions to a peripheral device that implements/performs a network interface function, such as peripheral device 112 in FIG. 1. One exemplary improved peripheral device 200—according to some embodiments—is shown in FIG. 2. Peripheral device 112 shown in FIG. 1 may be an instance of a peripheral device such as peripheral device 200. Other peripherals (which are producing/consuming data, e.g. peripheral devices 114 ... 116 shown in FIG. 1) in a system that includes at least one improved peripheral device (as disclosed herein) may not require any changes. Accordingly, one or more functions may be added to the improved peripheral device, as will be further discussed below. It should also be noted, with regards to peripheral device 200, that various currently existing embodiments of Memory Mapped Interconnect Interface 212 and Network Transmission/Reception Layer Interface 208 may be included and used in peripheral device 200.

Overall, various components and/or functions may be included in a peripheral device to enable the peripheral device to implement a network interface capable of transmitting and receiving data on the network, using a schedule. Peripheral device 200 may therefore include Peripheral Data Buffers (PDBs) 220. Buffers 220 may temporarily hold data that is received from peer peripheral devices (for copying into scheduled network streams that are to be transmitted onto the network) or data that is to be sent to peer peripheral devices (which are copied out of scheduled streams received from the network). In reference to a system similar to system 100, by way of example, the improved peripheral device 200 may be represented by peripheral device 112, and peer peripheral devices may be represented by peripheral devices 114 ... 116. Peripheral device 200 may include one buffer per peer peripheral device per data set that is to be transmitted or received on a schedule. A peer peripheral may implement multiple data sets.

Peripheral device 200 may further include Network Data Buffers (NDBs) 222. Buffers 222 may hold the payload data of scheduled streams that are transmitted on the network or payload data of scheduled streams received from the network. There may be a buffer for each transmitted or received network stream. Data from multiple PDBs may be multiplexed into one NDB for transmission. Data received from a scheduled stream in one NDB may be distributed into multiple PDBs. The network transmission/reception layer 208 may be configured to transmit network streams using the payload data in the NDBs based on the schedule for each stream, and copy data into the NDBs upon receiving scheduled streams from the network.

Peripheral device 200 may also include a Data Handler Function (DHF) 210. The data handler function 210 may handle collecting data from multiple PDBs, and may copy them into an NDB (e.g. in a pre-specified order) for transmission onto the network. DHF 210 may also handle distributing data from one NDB into one or more PDBs upon reception of scheduled data from the network. DHF 210 may also facilitate the movement of data—received from the network—from the PDBs to the peer peripherals, using the memory mapped interconnect interface 212. DHF 210 may fetch data from the other peripheral devices (that have been configured to send data) before transmission is scheduled to occur on the network, through the memory mapped interconnect interface 212.

Peripheral device 200 may include a Scheduling Function (SF) 204 which may create a Data Handler (DH) transmit event before transmission of a stream to instruct the DHF 210 to fetch data from the other peripheral devices (e.g. from each of the other peripheral devices) and create the payload for the stream. The SF 204 may also create a DH receive event on reception of stream data (into an NDB) to instruct the DHF 210 to distribute the stream payload into one or more PDBs and send each data set (from a corresponding PDB) to the respective peripheral consuming the data set.

Figure 3:
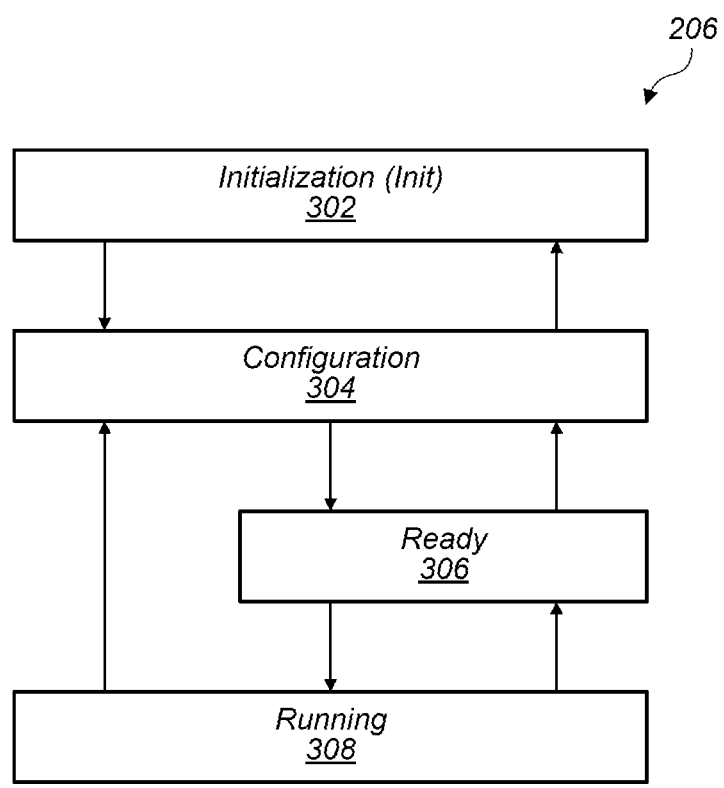
FIG. 3 shows an exemplary block diagram of the finite state machine from FIG. 2, according to some embodiments.

Peripheral device 200 may also include a state machine (SM) 206, one example of which—according to some embodiments—is shown in FIG. 3. SM 206 may function at the device level and may be controlled by a centralized system configuration entity that manages configuration for all devices exchanging scheduled streams on the network. SM 206 may be mirrored on peripheral device 200 to coordinate its internal configuration with the system (network) configuration flow. Peripheral device 200 may be informed of the different states of the network configuration via SM 206. Once network configuration is completed, peripheral device 200 may be requested to start the scheduled data transfer by setting the state of SM 206 to "Running" (308). The various states of SM 206 may be defined as follows, according to some embodiments:

Initialization: The initialization state (302) allows the application executing on the device (e.g. executing on device 100 shown in FIG. 1) to initialize its peripherals (e.g. peripherals 112 . . . 116 shown in FIG. 1, one of which may be an improved network interface peripheral device such as the one shown in FIG. 2, for example, one embodiment of which is shown operating as peripheral device 112 in FIG. 1). The network interface peripheral device may transition into this state when it is powered on, and may remain in this state until the application requests it to transition out of the Init state into the Configuration state. While in the Init state, the network interface peripheral device may perform the following (e.g. based on input from the application):

1. Create the PDBs and configure the DHF with the respective memory addresses of the data source peripherals and data sink peripherals. Data source peripherals may be defined as the peer-peripherals (e.g. peripherals 114 . . . 116 shown in FIG. 1) that produce the data which is included in the payload of the scheduled streams that are transmitted by the network interface peripheral. Data sink peripherals may be defined as the peer-peripherals which consume the data in the payload of the scheduled streams received by the network interface peripheral.
2. Create the NDBs based on the number of network streams and their payload sizes.

Configuration: After the application has finished initialization, it may transition into the Configuration state (304) automatically or upon request by a centralized system configuration entity. In the Configuration state, the network interface peripheral device is ready to receive stream transmission(s) and reception schedule information from the system configuration (via the application on the device). The schedule may contain the transmission times (e.g. period and offset within the period) for each stream transmitted on the network, and the latest arrival time of a stream received from the network.

Ready: The device may transition into the Ready state (306) after the schedule information has been successfully downloaded to it. In the Ready state, the network transmission/reception layer on the network interface peripheral device may be configured with the transmission and reception schedule. The SF may be configured with the transmit and receive events that inform the DHF when to perform its operations.

Running: The device may transition into the Running state (308) when all the devices exchanging scheduled streams have successfully transitioned to the Ready state (306) and the network is also appropriately configured. In the Running state, scheduled data transmission by the network transmission/reception layer may be activated. The SF creates the transmit events and receive events required for the DHF to perform its operations.

Exemplary Operation

Figure 4:
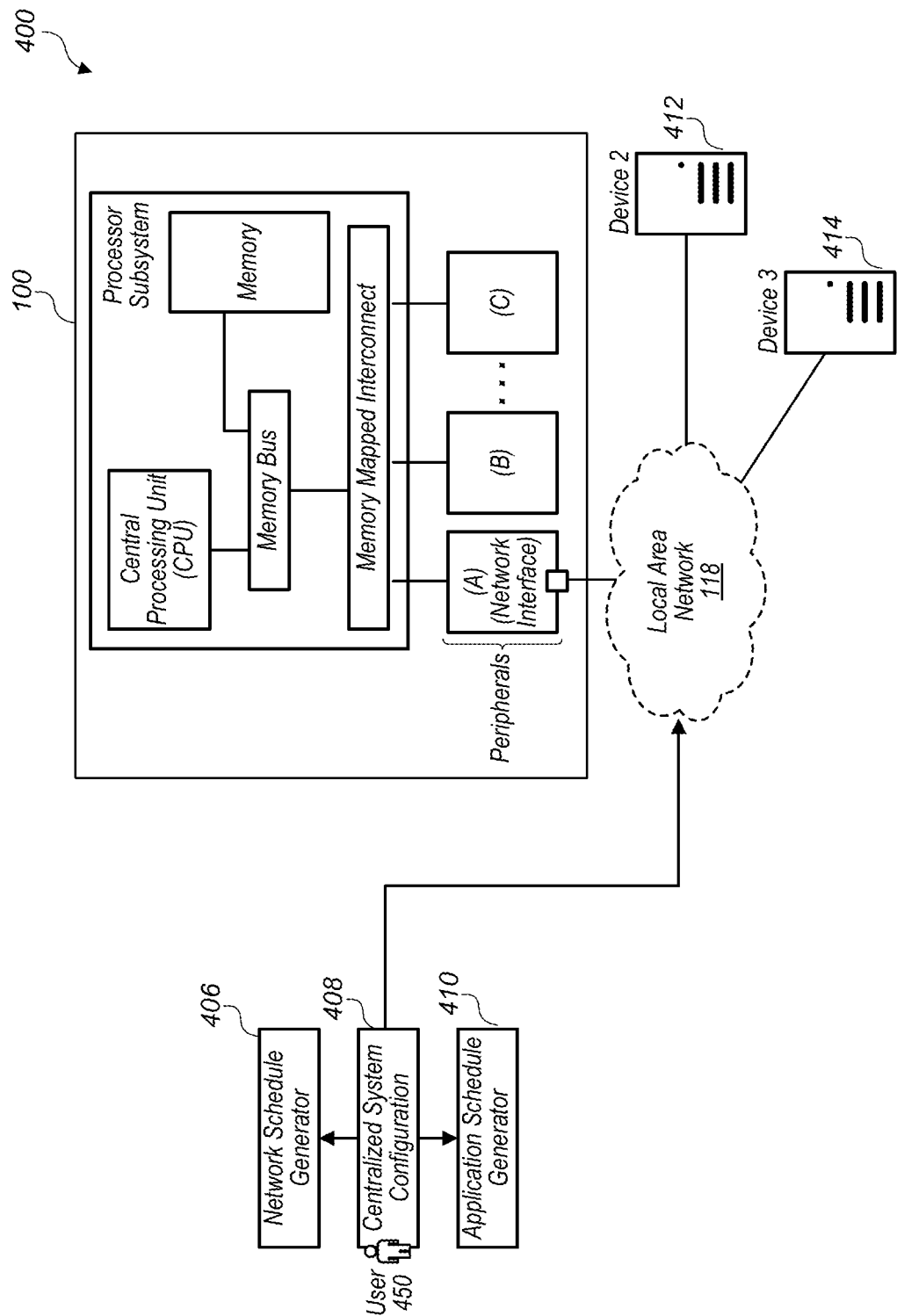
FIG. 4 shows an exemplary system diagram of a system configuration with an improved peripheral device, according to some embodiments.

FIG. 4 shows an exemplary system diagram of a system configuration with an improved network interface peripheral device, according to some embodiments. As shown in FIG. 4, a Centralized System Configuration 408, Network Schedule Generator 406 and Application Schedule Generator 410 may be external entities used to configure the system which is composed of multiple devices (100, 412, 414) connected to a network 118. The Network Schedule Generator 406 and the Application Schedule Generator 410 may be used to generate/implement timed-functions in system 400. Centralized System Configuration 408 may provide a configuration interface to the network for the device 100 and may operate as a link between the user 450, the Network Schedule Generator 406, the Application Schedule Generator 410 and the application executing on the device 100. A device 100, in this context, may be as shown in FIG. 1, and may include a CPU subsystem, a network interface peripheral device (A) and other peer-peripherals ((B) (C)), similar to the device 100 shown in FIG. 1. The application executing on the device 100 may include logic/instructions/functions executing on the CPU, and logic/instructions/functions executing on one or more peripherals. The application may generate (create) the links between the peer-to-peer data sources and data sinks with the network interface peripherals, and the data sources and sinks between the CPU and the peripherals (including the network interface peripheral device).

Figure 6:
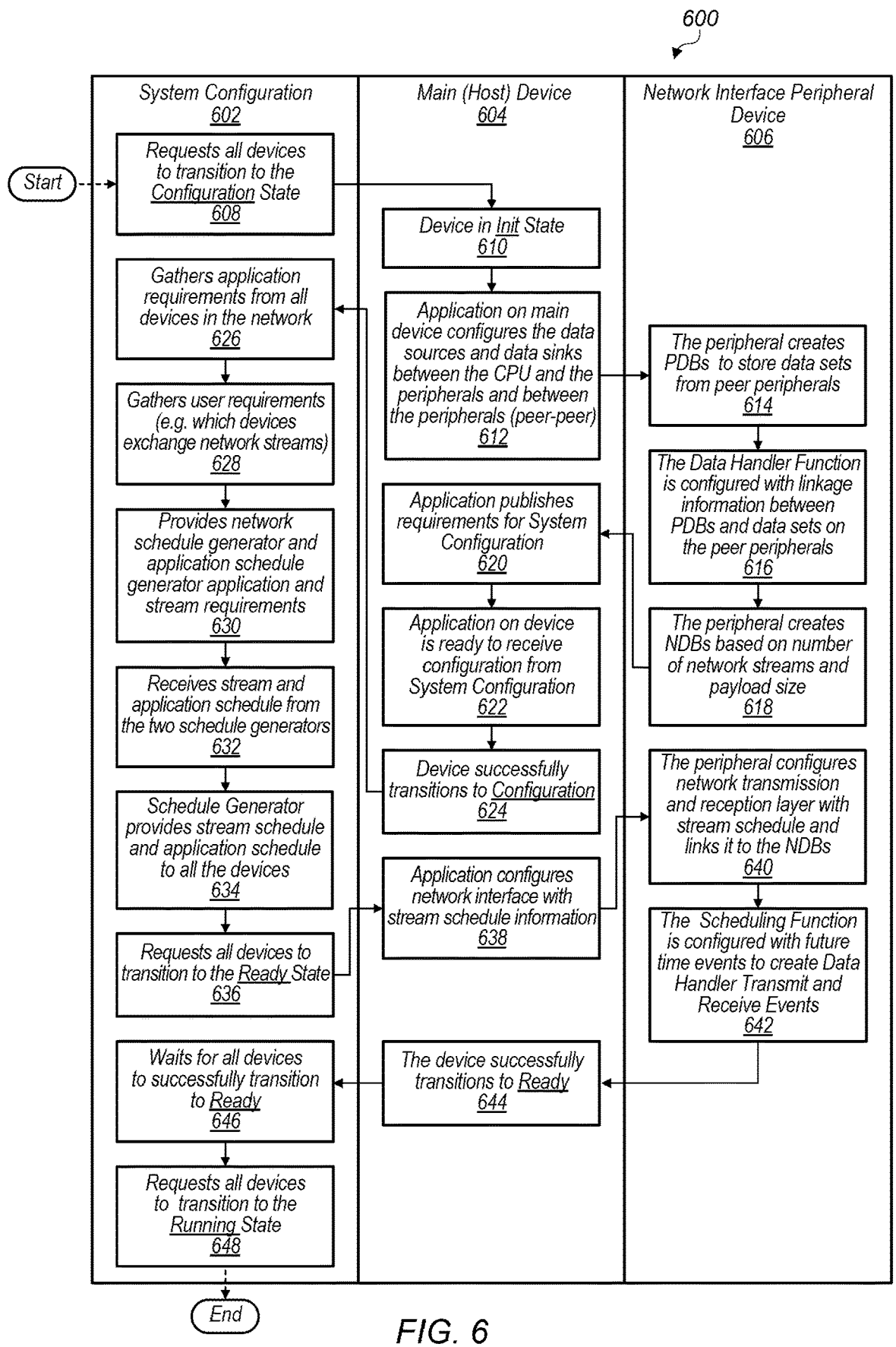
FIG. 6 shows an exemplary flow chart illustrating configuration of a network interface peripheral device that manages scheduled data transfer over the network, according to some embodiments.

FIG. 6 shows an exemplary flow chart illustrating configuration of a network interface peripheral device that manages scheduled data transfer over the network. In other words, FIG. 6 illustrates configuration of the network interface peripheral device to send and receive data streams from peer-peripherals according to specified time schedule(s). When the network interface peripheral device (e.g. peripheral device (A) in FIG. 4 or peripheral device 112 in FIG. 1) is powered on, it starts in the Initialization State (610). It should be noted that the various states are referenced with respect to the SM 206, as detailed in FIG. 3. While in the Initialization state (610), the application executing on the main device (e.g. on main device 100) may receive a request from the system configuration entity (e.g. entity 408 shown in FIG. 4) to transition to the Configuration state (608). Upon receiving that request, the application executing on the main device may perform internal application initialization which may include configuring the data sources and data sinks between the CPU and the peripherals, and between the various peripherals—i.e. peer-to-peer peripheral configuration (612). The internal application initialization may also include configuring the network interface peripheral device with the PDBs to store the data sets from the peer peripherals (614). The application may then configure the DHF with the source and sink information of the PDBs, e.g. with link information between PDBs and data sets on the peer peripherals (616). The network interface peripheral device may then create the mapping between the PDBs and NDBs, e.g. based on the number of network streams and payload size (618).

The application may then publish the requirements for system configuration, e.g. the number of network streams it intends to transmit/receive, and may also publish the application timing constraints (e.g. fastest period it can run the application, minimum preparation time before performing any function, etc.) for the system configuration to read (620). At this point the application (running) on the main device is ready to receive configuration information from the system configuration (622). After this internal initialization the application may transition the main device into the Configuration state (624).

The Network Schedule Generator 406 (referring to FIG. 4) may operate to schedule the network streams between devices connected to each other over the network (e.g. devices 100, 412 and 414 in FIG. 4). The Application Schedule Generator may compute the schedule of timed-functions on the master device. The system configuration entity reads the published stream and application timing information (626). It may obtain the user requirements—e.g. period of streams, stream link information, latency requirements etc. —(628), and provide these user requirements along with the stream and application timing constraints to the Application Schedule Generator (630). The Application Schedule Generator (e.g. the Application Schedule Generator 410 in FIG. 4) may compute the stream relationships (e.g. does one stream need to finish before the second one starts, etc.) and possible start times for the streams and the maximum latency acceptable to meet the application timing constrains. This information is then relayed to the network schedule generator (632) which computes the schedule for the streams within the network. It returns the start time of streams for transmission and the expected arrival time of the streams for reception to the system configuration entity. The system configuration distributes this information along with application timing information to all the devices it is configuring (634). Then it requests all the devices to transition to the Ready state (636).

Receipt of a state transition request by the (main) device to transition to the Ready state is indicative of the application executing/running on the (main) device having received the stream schedule and application timing information. Accordingly, the main device provides the stream schedule to the network interface peripheral device (638). The network interface peripheral device then configures the network transmission and reception layer with this schedule and links it to the NDBs (640). The network interface peripheral device also configures the SF with timing information indicative of (or indicating) when to create the DH transmit events and DH receive events (642). These events instruct the DH to move the data between the PDBs and the other peripherals, and between the PDBs and the NDBs.

Figure 5:
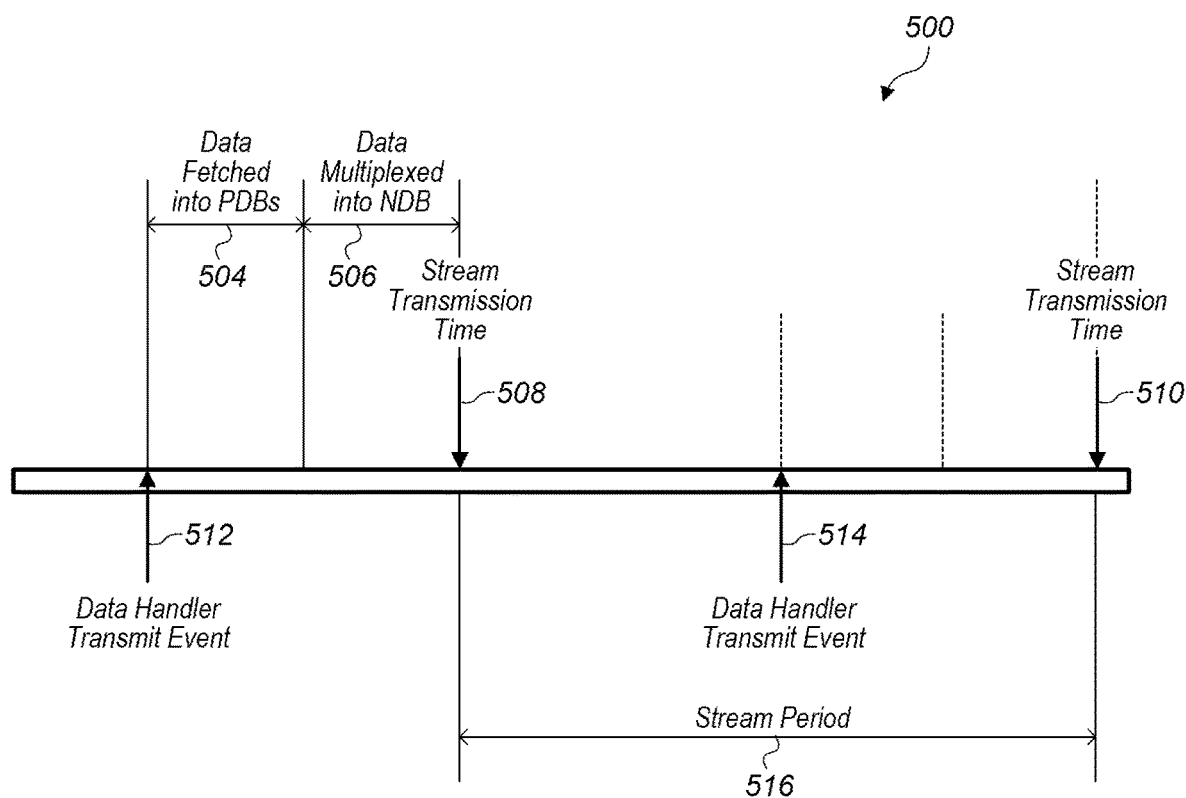
FIG. 5 shows an exemplary timing diagram illustrating the timing of a data handler transmit event, according to some embodiments.

The DH transmit event may be computed based on a specified time duration (e.g. a maximum time duration, which may be considered worst case) it may take to fetch the data from the peripheral device into the PDBs, and copying the data from the PDBs into the NDB. This ensures that the data is ready in the NDB before the deadline of the transmission time. There may be a one-to-one mapping between a DH transmit event and a transmitted stream. Upon reception, the SF may signal the DH when the data in an NDB has arrived by creating a DH receive event. The DH then distributes the data from the NBD to one or more PDBs and sends them from the PDBs to the peer peripherals. There may be a one-to-one mapping between a DH reception event and a received stream. This is illustrated in the timing diagram 500 shown in FIG. 5. As seen in timing diagram 500, upon a DH start event being initiated (512), the data is fetched into the PDBs (504), then multiplexed into the NDB (506), subsequent to which the data stream transmission may begin (508). The data stream transmission period may be of a specified duration (516), during which another DH transmit event may be initiated (514) such that a new data stream transmission may begin (510) upon completion of the present data stream transmission (516).

Referring again to FIG. 6, after the network interface has been configured with the schedule information, the device successfully transitions to the Ready state (644). When all devices configured by the system configuration have successfully transitioned to the Ready state (646), the system configuration may request all the devices to transition to the Running state (648). At this point the configuration is complete.

In the Running state, data streams may be transmitted at specified points in time (e.g. every period, at a specified offset) by the network interface peripheral device, and the DH events may be initiated for data stream transmission and reception as configured, at specified points in time (e.g. every period), to move the data between the stream payload and the peer peripherals.

Various Embodiments

In some embodiments, the DHF may be implemented on a peripheral device other than the network interface peripheral device. Furthermore, the DHF may be configured with future time events for creating the receive events rather than explicit signals from the SF upon arrival of data into the NDB. In such cases the DH receive event may be computed by taking into account a specified latency (e.g. maximum latency, or arrival time) of the data stream provided by the centralized system configuration entity. In some embodiments, the DHF may be disaggregated into two separate components (or sub-functions). A first components may facilitate the data transfer into the PDBs from the NBD and from the NBD to the PBDs, and a second component may facilitate transmission of the data between the peripherals and the PDBs. In some embodiments, the peripheral devices may be configured with future time events (assuming the peripheral devices have synchronized clocks with respect to each other) to push and pull data from PBDs on the network interface peripheral device instead of the DHF on the network interface peripheral device performing the pushing and pulling of data.

Exemplary Systems

Various embodiments disclosed herein may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others. However, it is noted that various embodiments may be used for a plethora of applications and is not limited to the above applications. In other words, applications discussed in the present description are exemplary only, and the disclosed embodiments may be used in any of various types of systems. Thus, embodiments of the system and method disclosed herein may be configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

The following describes various exemplary systems that may implement embodiments of the present techniques.

Figure 7A:
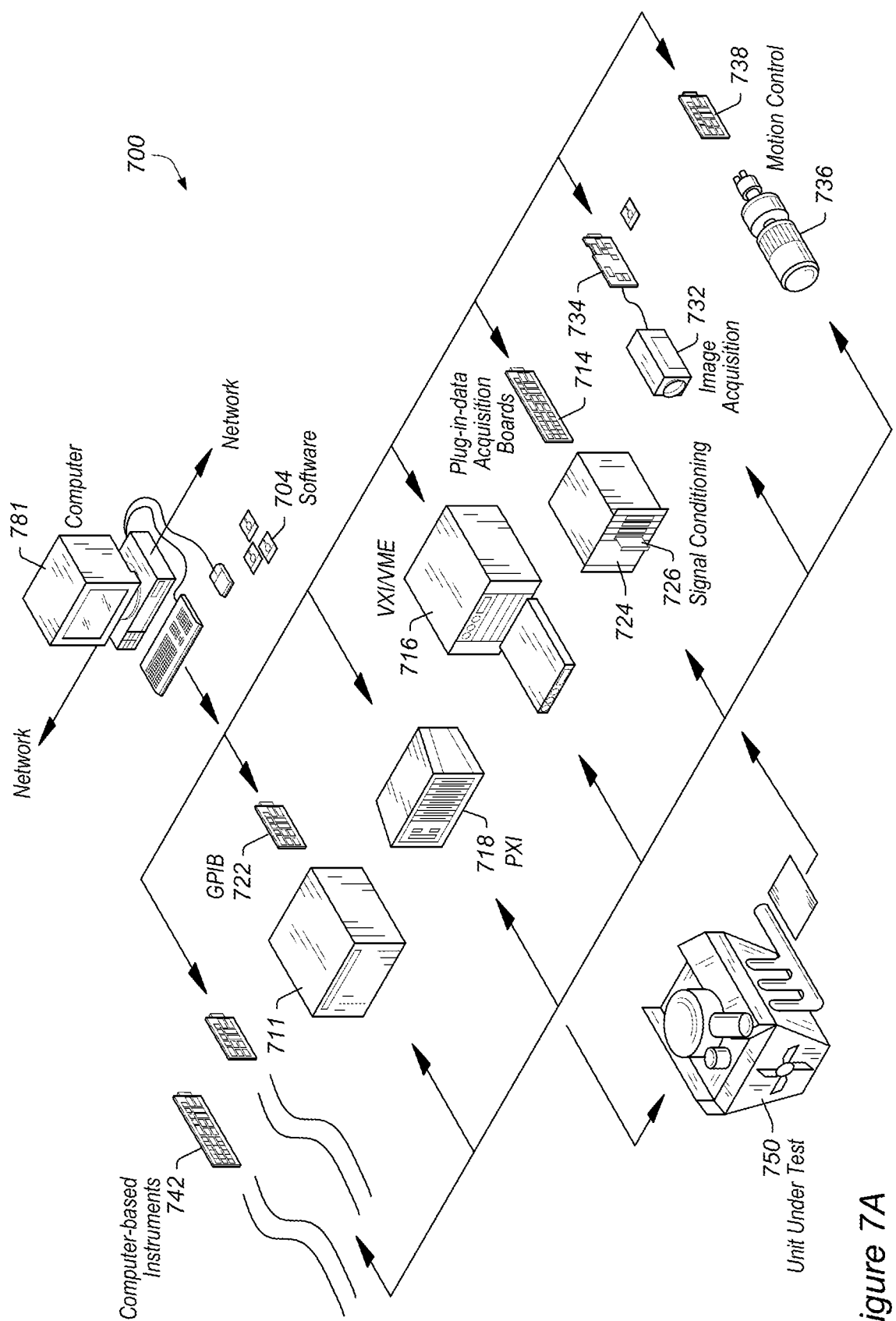
FIG. 7A illustrates an exemplary instrumentation control system according to some embodiments.

FIG. 7A illustrates an exemplary instrumentation control system 700 which may implement various embodiments disclosed herein. The system 700 comprises a host computer 781 which couples to one or more instruments. The host computer 781 may comprise a CPU, a display screen, memory, and one or more input devices such as a mouse or keyboard as shown. The computer 781 may operate with the one or more instruments to analyze, measure or control a unit under test (UUT) or process 750, e.g., via execution of software 704.

The one or more instruments may include a GPIB instrument 711 and associated GPIB interface card 722, a data acquisition board 714 inserted into or otherwise coupled with chassis 724 with associated signal conditioning circuitry 726, a VXI instrument 716, a PXI instrument 718, a video device or camera 732 and associated image acquisition (or machine vision) card 734, a motion control device 736 and associated motion control interface card 738, and/or one or more computer based instrument cards 742, among other types of devices. The computer system may couple to and operate with one or more of these instruments. The instruments may be coupled to the unit under test (UUT) or process 750, or may be coupled to receive field signals, typically generated by transducers. The system 700 may be used in a data acquisition and control application, in a test and measurement application, an image processing or machine vision application, a process control application, a man-machine interface application, a simulation application, or a hardware-in-the-loop validation application, among others.

Figure 7B:
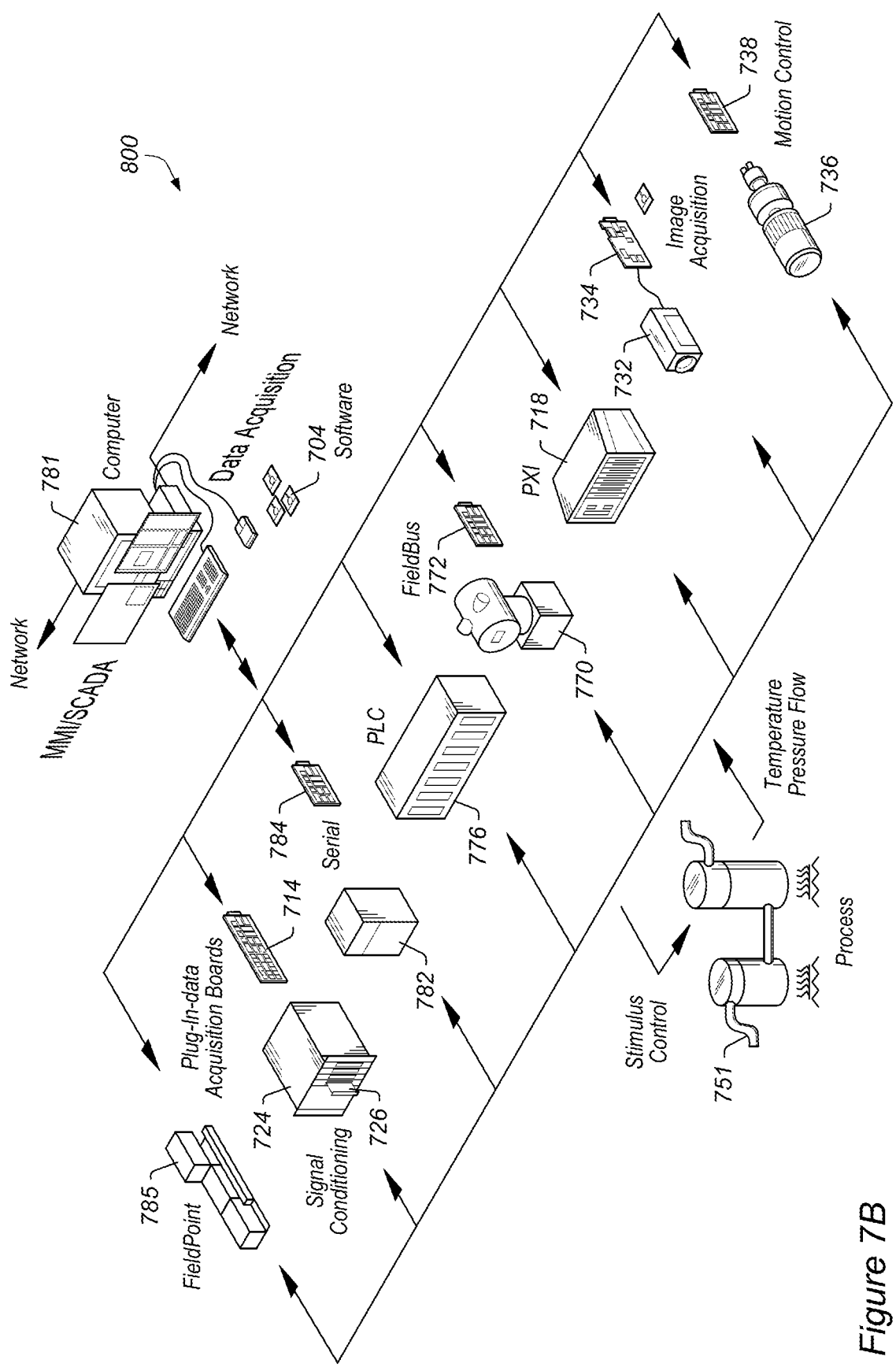
FIG. 7B illustrates an exemplary industrial automation system according to some embodiments.

FIG. 7B illustrates an exemplary industrial automation system 800 which may implement embodiments disclosed herein. The industrial automation system 800 is similar to the instrumentation or test and measurement system 700 shown in FIG. 7A. Elements which are similar or identical to elements in FIG. 7A have the same reference numerals for convenience. The system 800 may comprise a computer 781 which couples to one or more devices or instruments. The computer 781 may comprise a CPU, a display screen, memory, and one or more input devices such as a mouse or keyboard as shown. The computer 781 may operate with the one or more devices to perform an automation function with respect to a process or device 751, such as HMI (Human Machine Interface), SCADA (Supervisory Control and Data Acquisition), portable or distributed data acquisition, process control, advanced analysis, or other control, among others, e.g., via execution of software 704.

The one or more devices may include a data acquisition board 714 inserted into or otherwise coupled with chassis 724 with associated signal conditioning circuitry 726, a PXI instrument 718, a video device 732 and associated image acquisition card 734, a motion control device 736 and associated motion control interface card 738, a fieldbus device 770 and associated fieldbus interface card 772, a PLC (Programmable Logic Controller) 776, a serial instrument 782 and associated serial interface card 784, or a distributed data acquisition system, such as Fieldpoint system 785, available from National Instruments Corporation, among other types of devices.

Figure 8A:
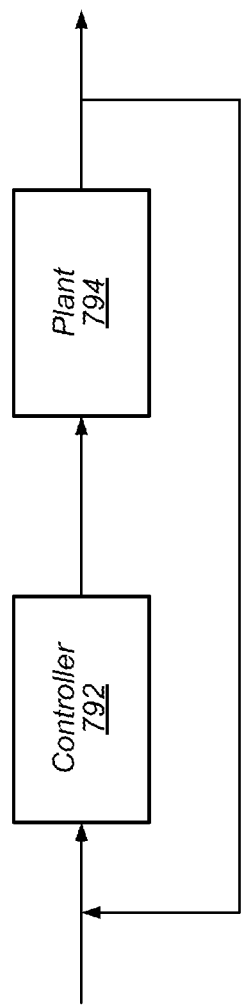
FIG. 8A is a high level block diagram of an exemplary system which may execute or utilize graphical programs, according to some embodiments.

FIG. 8A is a high level block diagram of an exemplary system which may execute or utilize graphical programs. FIG. 8A illustrates a general high-level block diagram of a generic control and/or simulation system which comprises a controller 792 and a plant 794. The controller 792 represents a control system/algorithm the user may be trying to develop. The plant 794 represents the system the user may be trying to control. For example, if the user is designing an ECU for a car, the controller 792 is the ECU and the plant 794 is the car's engine (and possibly other components such as transmission, brakes, and so on.) As shown, a user may create a graphical program that specifies or implements the functionality of one or both of the controller 792 and the plant 794. For example, a control engineer may use a modeling and simulation tool to create a model (graphical program) of the plant 794 and/or to create the algorithm (graphical program) for the controller 792.

Figure 8B:
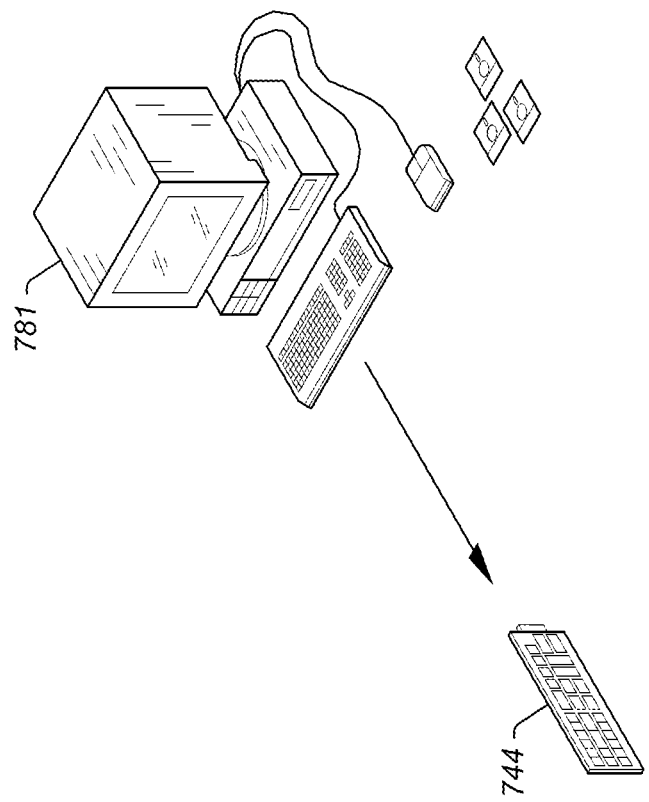
FIG. 8B illustrates an exemplary system which may perform control and/or simulation functions utilizing graphical programs, according to some embodiments.

FIG. 8B illustrates an exemplary system which may perform control and/or simulation functions. As shown, the controller 792 may be implemented by a computer system 781 or other device (e.g., including a processor and memory medium and/or including a programmable hardware element) that executes or implements a graphical program. In a similar manner, the plant 794 may be implemented by a computer system or other device 744 (e.g., including a processor and memory medium and/or including a programmable hardware element) that executes or implements a graphical program, or may be implemented in or as a real physical system, e.g., a car engine.

In some embodiments, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 792, e.g., on a computer system or other device. The computer system 781 may be a platform that supports real time execution, e.g., a device including a processor that executes a real time operating system (RTOS), or a device including a programmable hardware element.

In some embodiments, one or more graphical programs may be created which are used in performing Hardware in the Loop (HIL) simulation. Hardware in the Loop (HIL) refers to the execution of the plant model 794 in real time to test operation of a real controller 792. For example, once the controller 792 has been designed, it may be expensive and complicated to actually test the controller 792 thoroughly in a real plant, e.g., a real car. Thus, the plant model (implemented by a graphical program) is executed in real time to make the real controller 792 "believe" or operate as if it is connected to a real plant, e.g., a real engine.

In the embodiments of FIGS. 7A, 7B, and 8B above, one or more of the various devices may couple to each other over a network, such as the Internet. In one embodiment, the user operates to select a target device from a plurality of possible target devices for programming or configuration using program, e.g., a graphical program. Thus the user may create a (possibly graphical) program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 7A and 7B, may be referred to as virtual instruments. It should be noted that in various embodiments, one or more of the software (or firmware) program or components used to implement the present techniques, e.g., timed functions, schedule generator(s), etc., may be implemented in any kind of programs desired, including textual and/or graphical programs, e.g., graphical data flow programs.

FIG. 10—Computer System Block Diagram

Figure 9:
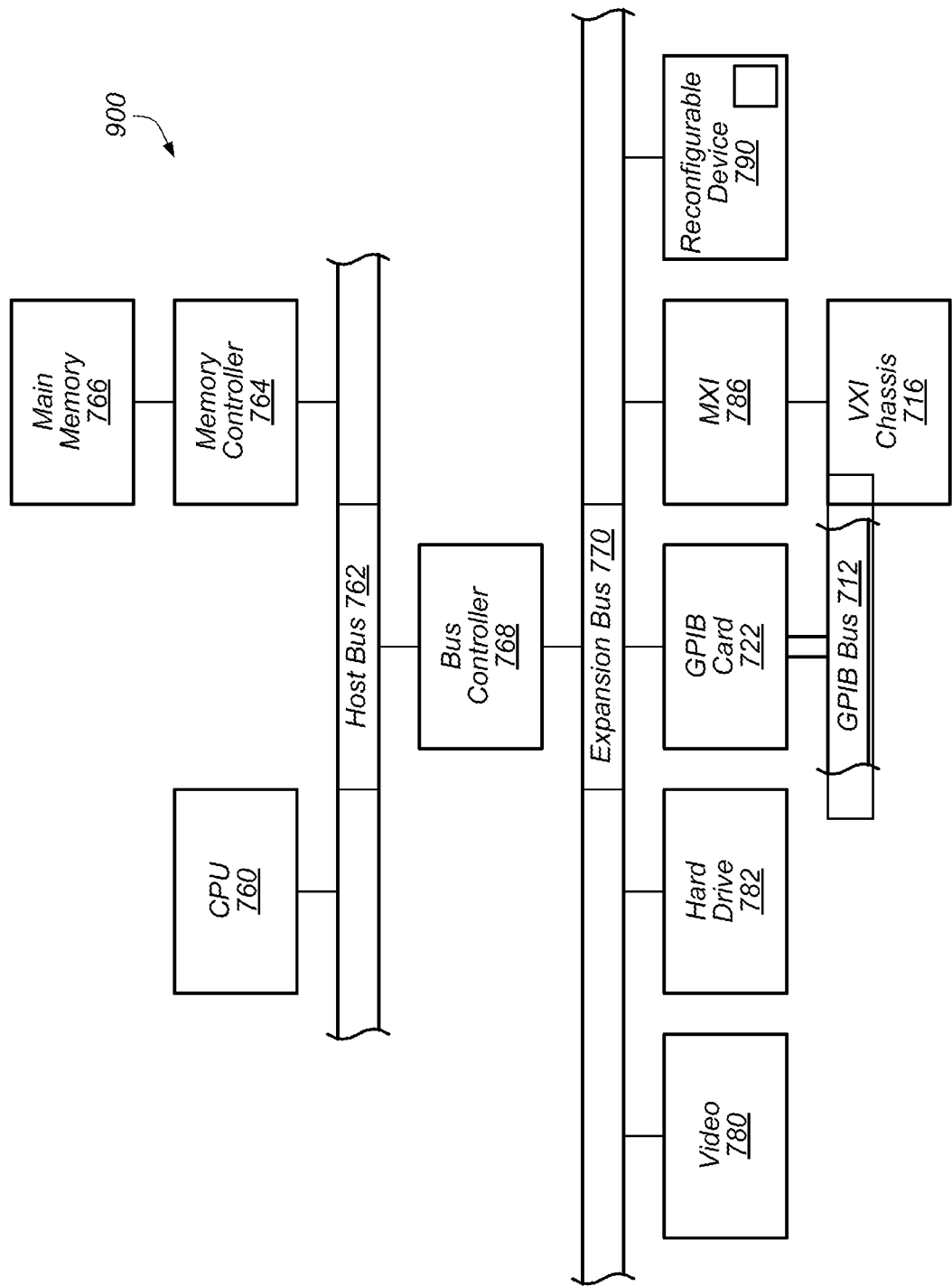
FIG. 9 is an exemplary block diagram of the computer systems of FIGS. 7A, 7B, and 8B, according to some embodiments.

FIG. 9 is a block diagram 900 representing one embodiment of the computer system 781 in FIGS. 7A, 7B, and 8B. It is noted that any type of computer system configuration or architecture can be used as desired, and FIG. 9 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 760 which is coupled to a processor or host bus 762. The CPU 760 may be any of various types, including an x86 processor, e.g., a Pentium class, a PowerPC processor, an Intel® Core™ i7 class, a CPU from the SPARC family of RISC processors, as well as others. A memory medium, typically comprising RAM and referred to as main memory, 766 is coupled to the host bus 762 by means of memory controller 764. The main memory 766 may store one or more programs implementing the techniques disclosed herein. The main memory may also store operating system software, as well as other software for operation of the computer system.

The host bus 762 may be coupled to an expansion or input/output bus 770 by means of a bus controller 768 or bus bridge logic. The expansion bus 770 may be the PCI (Peripheral Component Interconnect) expansion bus, although other bus types can be used. The expansion bus 770 includes slots for various devices such as described above. The computer 781 further comprises a video display subsystem 780 and hard drive 782 coupled to the expansion bus 770. The computer 781 may also comprise a GPIB card 722 coupled to a GPIB bus 712, and/or an MXI device 786 coupled to a VXI chassis 716.

As shown, a device 790 may also be connected to the computer. The device 790 may include a processor and memory which may execute a real time operating system. The device 790 may also or instead comprise a programmable hardware element. The computer system may be configured to deploy a (possibly graphical) program to the device 790 for execution of the program on the device 790. In some embodiments, the deployed program may be a graphical program, and may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Alternatively, the program may be a textual program.

The following describes exemplary creation of a graphical program, according to one embodiment. First, a graphical user interface or front panel for the graphical program may be created, e.g., in response to user input. The graphical user interface may be created in any of various ways, e.g., depending on the graphical programming development environment used. A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Other techniques for creating graphical programs may be used as desired, e.g., programmatically, or a combination of manual and programmatic techniques.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A network interface peripheral device, NIPD, capable of facilitating scheduled data transfer over a network, comprising:
    a memory mapped interconnect interface configured to enable:
        direct peer-to-peer data transfers between the NIPD and a processor subsystem external to the NIPD; and
        direct peer-to-peer data transfers between the NIPD and peer peripheral devices coupled to the processor subsystem and external to the NIPD and the processor subsystem, via a memory mapped interconnect in the processor subsystem that allows direct peer-to-peer data exchange between the NIPD and the peer peripheral devices and also between the peer peripheral devices, bypassing a memory bus and memory of the processor subsystem;
    a network interface configured to enable direct data transfers between the NIP and the network external to the NIPD and external to the processor subsystem;
    a data handler configured to:
        collect peripheral data received from the peer peripheral devices into a network data buffer in a pre-specified order, thereby creating payload data for data stream transmission onto the network; and
        distribute network data received from the network into one or more peripheral data buffers; and
    a scheduler configured to:
        receive scheduling information from a centralized system configuration entity external to the NIPD;
        create transmit events before transmission of data streams onto the network, wherein the transmit events instruct the data handler to collect the peripheral data and create the payload data for the transmission of the data streams according to the scheduling information, wherein there is a one-to-one mapping between each transmit event and a corresponding data stream to be transmitted; and
        create receive events, wherein the receive events instruct the data handler to distribute received network data into the one or more peripheral buffers and transmit the received network data from the one or more peripheral buffers to corresponding peer peripheral devices of the peer peripheral devices according to the scheduling information, wherein there is a one-to-one mapping between each receive event and a corresponding received network data stream.

2. The network interface peripheral device of claim 1, wherein the scheduler is configured to create the transmit events and receive events in response to scheduled data transmission by a transmission/reception layer on the peripheral device being activated.

3. The network interface peripheral device of claim 1, wherein the scheduler is configured to receive the scheduling information during a configuration phase of the peripheral device prior to any data transfers being conducted by the peripheral device.

4. The network interface peripheral device of claim 1, wherein the peripheral data comprises one or more data sets, wherein the one or more peripheral data buffers comprise one respective buffer per peer peripheral device per data set.

5. The network interface peripheral device of claim 1, wherein the peripheral data comprises multiple data sets corresponding to a single peer peripheral device.

6. The network interface peripheral device of claim 1, wherein the network data buffer comprises one respective buffer per scheduled data stream of the data streams.

7. The network interface peripheral device of claim 1, wherein the data peer peripheral devices comprise:
    data source peripherals that produce data included in the payload data; and
    data sink peripherals that consume data included the received network data.

8. The network interface peripheral device of claim 1, wherein the data handler is further configured to multiplex peripheral data from multiple buffers in the one or more peripheral data buffers into a single buffer in the network data buffer.

9. The network interface peripheral device of claim 1, wherein the data handler is further configured to distribute payload data from a single buffer in the network data buffer into multiple buffers in the one or more peripheral data buffers.

10. The network interface peripheral device of claim 1, wherein the data handler is further configured to use the memory mapped interconnect interface to perform at least one of the following:
    transmit data to the peer peripheral devices from the one or more peripheral data buffers; or
    receive data from the peer peripheral devices into the one or more peripheral data buffers.

11. The network interface peripheral device of claim 1, further comprising a state machine configured to coordinate internal initialization and set up of the peripheral device with a centralized system configuration flow.

12. The network interface peripheral device of claim 11, wherein the state machine is controlled by the centralized system configuration entity.

13. A host device comprising:
    a processor subsystem comprising a memory mapped interconnect and configured to execute one or more applications;
    one or more peer peripheral devices coupled to the processor subsystem; and
    a network interface peripheral device (NIPD) external to the processor subsystem and the one or more peripheral devices and capable of facilitating scheduled data transfer over a network external to the NIPD and the processor subsystem, the NIPD comprising:
        a memory mapped interconnect interface configured to enable:
            direct peer-to-peer data transfers between the NIPD and the processor subsystem; and
            direct peer-to-peer data transfers between the NIPD and the one or more peer peripheral devices via the memory mapped interconnect in the processor subsystem that allows direct peer-to-peer data exchange between the NIPD and the one or more peer peripheral devices and also between the one or more peer peripheral devices, bypassing a memory bus and memory of the processor subsystem;
a network interface configured to enable direct data transfers between the NIPD and the network;
a data handler configured to:
  collect peripheral data received from the one or more peer peripheral devices into a network data buffer in a pre-specified order, thereby creating payload data for data stream transmission onto the network; and
  distribute network data received from the network into one or more peripheral data buffers; and
a scheduler configured to:
  receive scheduling information from a centralized system configuration entity external to the NIPD;
  create transmit events before transmission of data streams onto the network, wherein the transmit events instruct the data handler to collect the peripheral data and create the payload data for the transmission of the data streams according to the scheduling information, wherein there is a one-to-one mapping between each transmit event and a corresponding data stream to be transmitted; and
  create receive events, wherein the receive events instruct the data handler to distribute received network data into the one or more peripheral buffers and transmit the received network data from the one or more peripheral buffers to corresponding peer peripheral devices of the peer peripheral devices according to the scheduling information, wherein there is a one-to-one mapping between each receive event and a corresponding received network data stream.

14. The host device of claim 13, wherein the scheduler is configured to create the transmit events and receive events in response to scheduled data transmission by a transmission/reception layer on the peripheral device being activated.

15. The host device of claim 13, wherein the peripheral data comprises one or more data sets, wherein the one or more peripheral data buffers comprise one respective buffer per peer peripheral device per data set.

16. The host device of claim 13, wherein each transmit event is computed based on a specified time duration it takes to:
  fetch corresponding peripheral data from the one or more peripheral devices into the one or more peripheral data buffers; and
  collect the fetched data from the one or more peripheral data buffers into the network data buffer.

17. The host device of claim 13, the NIPD further comprising a state machine configured to coordinate internal initialization and set up of the NIPD with the centralized system configuration entity.

18. A networked system for scheduled data transfer on a network, the networked system comprising:
a centralized system configuration entity configured to interface with the network and configure one or more components of the networked system; and
a main host device comprising:
  a processor subsystem comprising a memory mapped interconnect and configured to execute one or more applications;
  one or more peer peripheral devices coupled to the processor subsystem; and
  a network interface peripheral device (NIPD) external to the processor subsystem and the one or more peripheral devices and capable of facilitating scheduled data transfer over the network external to the NIPD and the processor subsystem, the NIPD comprising:
    a memory mapped interconnect interface configured to enable:
      direct peer-to-peer data transfers between the NIPD and the processor subsystem; and
      direct peer-to-peer data transfers between the NIPD and the one or more peer peripheral devices via the memory mapped interconnect in the processor subsystem that allows direct peer-to-peer data exchange between the NIPD and the one or more peer peripheral devices and also between the one or more peer peripheral devices, bypassing a memory bus and memory of the processor subsystem;
    a network interface configured to enable direct data transfers between the NIPD and the network;
    a data handler configured to:
      collect peripheral data received from the one or more peer peripheral devices into a network data buffer in a pre-specified order, thereby creating payload data for data stream transmission onto the network; and
      distribute network data received from the network into one or more peripheral data buffers; and
    a scheduler configured to:
      receive scheduling information from a centralized system configuration entity external to the NIPD;
      create transmit events before transmission of data streams onto the network, wherein the transmit events instruct the data handler to collect the peripheral data and create the payload data for the transmission of the data streams according to the scheduling information, wherein there is a one-to-one mapping between each transmit event and a corresponding data stream to be transmitted; and
      create receive events, wherein the receive events instruct the data handler to distribute received network data into the one or more peripheral buffers and transmit the received network data from the one or more peripheral buffers to corresponding peer peripheral devices of the peer peripheral devices according to the scheduling information, wherein there is a one-to-one mapping between each receive event and a corresponding received network data stream.

19. The networked system of claim 18, wherein the NIPD further comprises a state machine configured to coordinate internal initialization and set up of the NIPD, wherein the state machine is controlled by the centralized system configuration entity.

20. The networked system of claim 18, further comprising one or more additional host devices configured to interface with the network.

* * * * *